United States Patent

[11] 3,568,840

| [72] | Inventor | Atsushi Hashimoto Yokohama-shi, Japan |
| --- | --- | --- |
| [21] | Appl. No. | 786,641 |
| [22] | Filed | Dec. 24, 1968 |
| [45] | Patented | Mar. 9, 1971 |
| [73] | Assignee | Mitsubishi Kasel Kogyo Kabushiki Kaisha, Tokyo-to-Japan |
| [32] | Priority | Dec. 30, 1967 |
| [33] | | Japan |
| [31] | | 42/84765 |

[54] PACKING MATERIALS FOR GEL PERMEATION CHROMATOGRAPHY
13 Claims, 18 Drawing Figs.

| [52] | U.S. Cl. | 210/198, 23/141 |
| --- | --- | --- |
| [51] | Int. Cl. | B01d 15/08 |
| [50] | Field of Search | 210/31 (C), 198 (C); 23/141 |

[56] References Cited
UNITED STATES PATENTS

| 2,693,457 | 11/1954 | Drake et al. | 23/141X |
| --- | --- | --- | --- |
| 3,002,823 | 10/1961 | Flodin et al. | 210/31X |
| 3,298,925 | 1/1967 | Mosbach | 210/198X |
| 3,369,007 | 2/1968 | Flodin | 210/198X |
| 3,376,106 | 4/1968 | Gring et al. | 23/141 |
| 3,376,694 | 4/1969 | Owens et al. | 55/67 |
| 3,417,028 | 12/1968 | Montgomery et al. | 23/141X |
| 3,458,437 | 7/1969 | Ouano | 210/198X |
| 3,467,595 | 9/1969 | Sten | 210/198X |
| 3,476,737 | 11/1969 | Emneus et al. | 210/31X |

*Primary Examiner*—J. L. Decesare
*Attorneys*—Bierman and Bierman, Harry C. Bierman and Jordan B. Bierman ABSTRACT: Packing material to be packed in columns of gel permeation chromatographic devices. The packing material comprises alumina having a particle size ranging from 10 to 70 microns, a distribution peak ranging from 10 to $10^5$ Angstrom units, and a ratio of the bottom extent of the sharp portion of the pore size distribution curve to the distribution peak of less than 2.

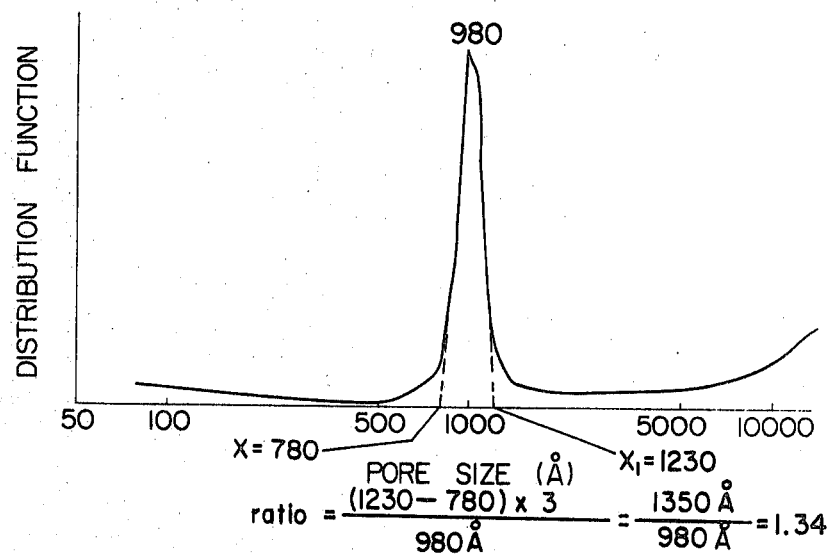
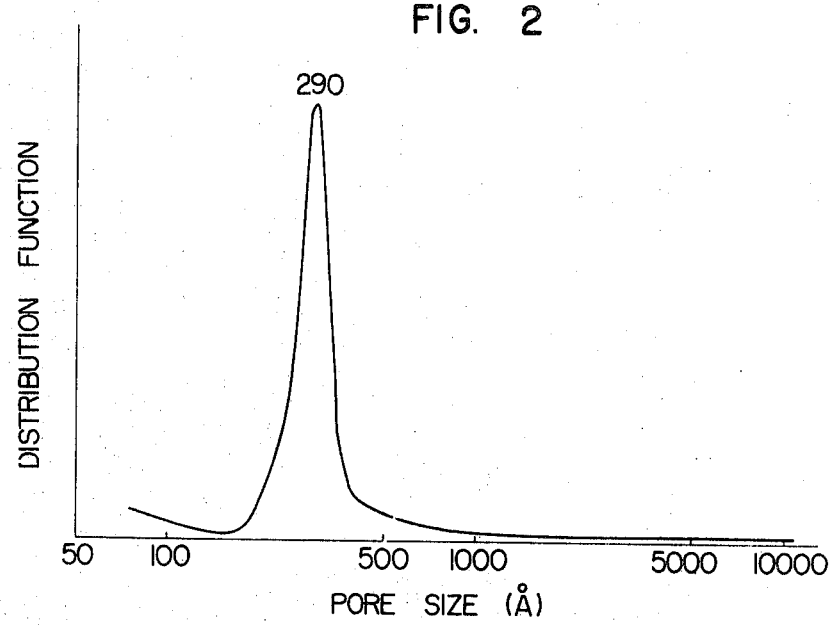

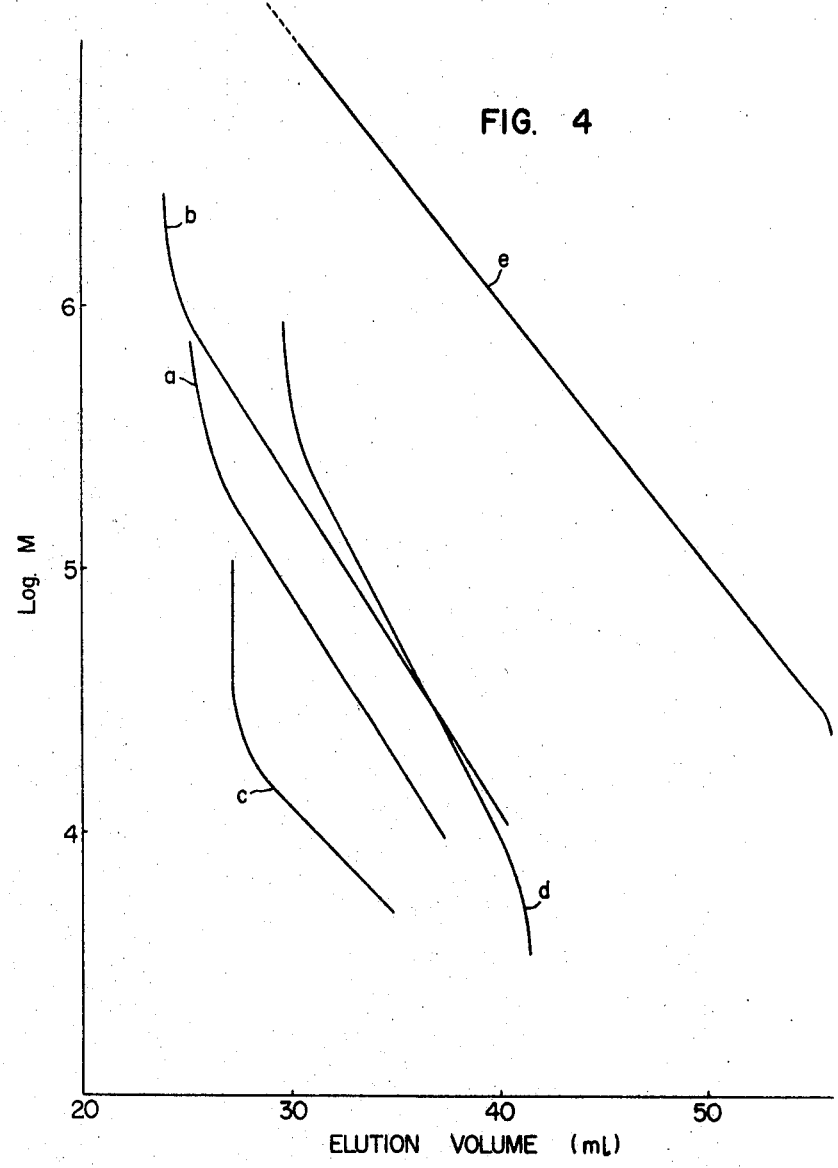

COUNTS

COUNTS

Atsushi Hashimoto, INVENTOR.

BY

Bierman & Bierman, ATTORNEYS.

COUNTS

COUNTS

COUNTS

COUNTS

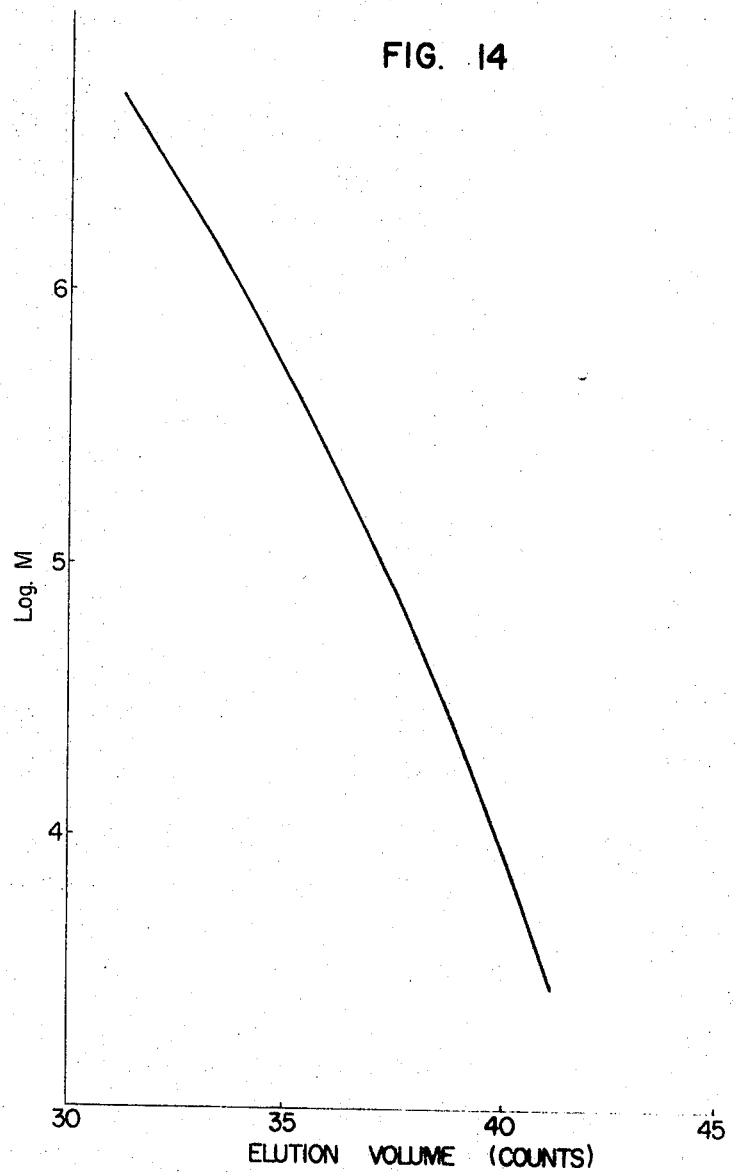

COUNTS

COUNTS

Atsushi Hashimoto, INVENTOR.

BY
Bierman & Bierman ATTORNEYS.

PACKING MATERIALS FOR GEL PERMEATION CHROMATOGRAPHY

BACKGROUND OF THE INVENTION

This invention relates to a new and improved gel permeation chromatographic device. More particularly this invention relates to a packing material suitable for use in gel permeation chromatography, said material comprising alumina, having an appropriate particle size and pore size distribution.

There has been an increase in the use of liquid phase chromatography as a means of analysis for separating solute molecules of different sizes.

Because the commonly used porous stationary phase takes the form of a solvent swollen network of cross-linked polymer, the term "Gel Permeation Chromatography" has been assigned to this special-type analytical technique.

According to this method, alumina is employed as the porous stationary phase. Although alumina is not generally termed a "gel," a special liquid chromatographic device which employs alumina as the packing material for the separation of solute materials of different sizes is herein referred to as the gel permeation chromatograph or GPC.

Heretofore, inorganic packing materials, such as porous silica and porous glass beads, or organic packing materials such as cross-linked polystyrene have been used as the packing material for the GPC. However, since it is difficult to obtain packing materials with satisfactory pore size distributions it is likewise difficult to effect a satisfactory separation of the solute molecules. Inorganic packing materials such as porous silica and porous glass beads are not useful, from a practical standpoint as they have a low effective pore volume and a wide pore size distribution. Thus their selectivity is extremely poor. Cross-linked polystyrene has a sufficiently high effective pore volume. Its pore size distribution however is wide. Thus it does not have a high selectivity and it is very difficult to efficiently separate solute molecules of a particular size range. Thus, in order to separate solute molecules of a particular size range, if cross-linked polystyrene is used as the packing material, the number of columns employed would have to be increased. With such an arrangement, however, it would not be possible to vary the pore size distribution of the packing material without broadening the entire elution curve of the solute molecules. Further, a longer time would be required for separating the solute molecules. Moreover, cross-linked polystyrene and other organic packing materials C., to swell and dissolve in the solvent for the substance to be detected and also tend to degrade at elevated temperatures. Thus when organic packing materials are employed at elevated temperatures their selectivity is decreased and their life shortened. For this reason, these packing materials are usually used at temperatures below 50° C.; and are rarely used at elevated temperatures, i.e. above 135° C. Thus, these conventional packing materials have proven to be unsatisfactory from the standpoint of selectivity and heat stability.

SUMMARY OF THE INVENTION

It is therefore an object of this invention to provide for a GPC a new and improved packing material having excellent selectivity, high heat stability and durability.

Another object of this invention is to provide an improved gel permeation chromatographic device capable of separating at high efficiency different size solute molecules by utilizing said novel packing material.

According to this invention these objects are attained by utilizing as the packing material an alumina having an appropriate particle size and pore size distribution.

In other types of chromatography it has been found that in order to improve selectivity it is necessary to use a support of suitable particle size. This holds true also with regard to the particle size of the alumina employed in this invention. The particle size range of the alumina should be from 10 to 70 microns, preferably from 30 to 60 microns, and most preferably from 30 to 50 microns.

With regard to the pore size distribution of the alumina employed, in order to obtain an efficient separation of solute molecules of, for example, polymerized substances, it is important to select an appropriate distribution peak and a narrow distribution. The alumina employed should have a distribution peak of from 10 to $10^5$ Angstrom units, preferably from 50 to $10^4$, and most preferably 50 to 25,000. It should be noted that as used in this specification, the term "distribution peak" is defined as the pore size (Angstrom units) where the peak in the pore size distribution curve exists. In order to increase the selectivity of GPC, it is necessary to utilize an alumina having a narrow pore size distribution. Desirable pore size distributions are those in which the ratio of the bottom extent of the sharp portion of the pore size distribution curve to the distribution peak is less than 2, preferably less than 1.8.

Insofar as I am aware there has been no literature reference directed to the expression of the pore size distribution or the sharpness of the pore size distribution curve. Assuming that the sharp portion has the form of a triangle, the term "bottom extent" is herein defined to mean a distance equal to 3 times the distance (in Angstrom units) between two points where two tangent lines along both sides of the triangle of the pore size distribution curve intersect the abscissa (see $x$ and $x_1$ in FIG. 1). Multiplying factor 3 is an arbitrarily selected constant. Thus in the case shown in FIG. 1 the ratio of the bottom extent of the sharp or triangular portion of the pore size distribution curve to the distribution peak is expressed as follows:

$$\frac{(1230-780)\times 3}{980}=\frac{1350}{980}=1.34$$

Although the above-mentioned ratio should preferably be below 1.8 a ratio below 0.5 may sometimes prove disadvantageous as at the ratio, it is impossible to separate the solute molecules with just one type of alumina packing material. Thus two types of alumina each having different distribution peaks, will be required for accurate separation of solute molecules, such as polymerized substances, which usually have more or less broad molecular weight distribution.

Any alumina having a particle size of from 10 to 70 microns, a distribution peak of from 10 to $10^5$ and a ratio of the bottom extent of the sharp portion of the pore size distribution curve to the distribution peak of less than 2, can be used as the alumina packing material of this invention. The alumina may be α-alumina, various alumina hydrates or intermediate phases of alumina. However, α-alumina, Θ-alumina and boehmite are preferred. Most preferred of these alumina packing materials are α-alumina Θ-alumina, and boehmite, having a distribution peak of 900 to 2500, 100 to 1000 and 50 to 1000 Angstrom units, respectively.

Further, the preferred alumina should have a large pore volume and high purity. A large pore volume assures a more efficient separation of solute molecules in the GPC. An alumina having a pore volume of at least 0.5 g./cc. is preferred. Of course, as the purity of the alumina depends largely upon raw materials or auxiliary materials utilized in its preparation; said materials should be highly purified. Care should be taken, especially when preparing hydrated alumina to minimize as far as possible the presence of residual acid radicals due to aluminum salt or acid. Care should also be taken to prevent the presence of residual alkali due to aluminate or caustic alkali. These impurities are deleterious in that they decrease the selectivity of the alumina packing material.

The novel alumina packing material of this invention may be used in any application of the GPC, as for example, in the measurement of the molecular weight distribution of various compounds, such as high and low molecular weight substances, or in the separation thereof and in any biochemical application in which the GPC is conventionally used.

When used to measure the molecular weight distribution, said novel alumina packing material is packed into a column, the substances to be detected, for example high molecular weight substances such as polyethylene, polystyrene, polyacrylate, polyurethane, polyvinylalcohol and the like, are dissolved in a suitable solvent such as tetrahydrofuran, benzene, chloroform, trichlorobenzene, dimethylformamide, water or the like, and the resultant solution is introduced into said packed column, to effect separation.

The concentration of the solution used is generally from about 0.25 to 2.5 percent, preferably less than 1 percent. Usually, the solution is introduced into the column at the rate of about 0.5 to 1.0 cc./min. A column temperature of about 25° C. is preferred, however this temperature may be elevated to any temperature at which the substance to be detected is still stable.

The type of novel packing material selected and the number of columns used depends upon the substances to be separated. Thus, for example, with proper selection of the pore size of the alumina packing material polymers having a relatively narrow molecular weight distribution can be separated and a sufficient selectivity can be achieved with a column containing only one type alumina packing material. This is so because the novel alumina packing material has sufficient pore volume and the sharp pore distribution necessary for effecting the separation. If need be, selectivity may be increased by increasing the number of columns. The analysis of polymers having a wide molecular weight distribution can be made with satisfactory selectivity by preparing several types of novel alumina packing materials having different pore sizes and by packing these materials in independent columns or by packing a mixture of them, said mixture having a controlled pore size distribution, in a single column or a plurality of columns. It is also possible to prepare the columns referred to above by using the novel alumina packing material in combination with a conventional packing material such as cross-linked polystyrene. When separating substances with a column packed with cross-linked polystyrene, a shoulder or other abnormal phenomenon is observed on the distribution curve, the separation can be achieved more effectively at the portion where said shoulder or abnormal phenomena is noted by determining the size of the molecule at said portion from a calibration curve and by adding or substituting a column containing novel alumina having a distribution peak several times as large as the size of the molecule thus determined.

Columns having different permeability limits have been combined in the prior art in order to improve the selectivity of the cross-linked polystyrene packing material. However, it proved to be impossible to obtain a high selectivity due to the relatively wide pore size distribution of the cross-linked polystyrene. An attempt was made to improve selectivity by increasing the number of columns, but again due to the wide pore size distribution, the selectivity was not improved. Increasing the number of columns only resulted in the prolongation of the measuring time and in the widening of the elution curve.

Alumina suitable for use in this invention may be prepared by hydrolyzing a water-soluble aluminum salt and then calcining the hydrolyzed alumina at a desired temperature. Various methods can be utilized in the preparation of a high purity alumina having a uniform pore size; however, it is essential to carefully select the aging conditions of the hydrolyzed alumina, raw materials or auxiliary materials.

More particularly, in order to obtain alumina having a high purity and particularly uniform pores it is advantageous to age the hydrolyzed alumina prior to its calcination. For example, the hydrolyzed alumina is preferably aged at a temperature of from about 150 to 220° C. for a relatively long period of time as for example more than 20 hours. Normally, the pH of the liquid is maintained at about 4.0 to 7.5. Proper selection of the aging conditions enables the control of such physical characteristics as pore size, porosity, bulk density, etc.

A preferred combination of the raw material and auxiliary materials involves the use of monobasic and aluminum salt as the raw material aluminum compound and an acidic carbonate as the auxiliary material. This combination serves to prevent residue of acid radicals or alkali thus, providing a high purity alumina. Preferred examples of monobasic acid aluminum salts include aluminum nitrate, aluminum chloride or the like, however other monobasic acid salts may also be used.

Ammonium hydrogen carbonate is usually preferred as the acid carbonate precipitating agent; however, other acid carbonates, for instance, sodium hydrogen carbonate, can also be utilized. Normally, these acid carbonates are used in the form of their aqueous solutions.

The type of alumina crystal obtained depends upon the calcining temperature. Thus for example, at temperatures ranging from 300 to 400° C., boehmite is obtained; at temperatures above 1200° C., α-alumina is obtained, and at temperatures from about 1050 to 1200° C., Θ-alumina is obtained.

BRIEF DESCRIPTION OF THE DRAWINGS

In the accompanying drawings

FIGS. 1, 2, and 3 show typical pore size distribution of aluminas which have been prepared under different conditions;

FIG. 4 shows a group of calibration curves comparing the selectivities of silica, glass beads and alumina;

FIG. 14 shows a calibration curve of four columns respectively packed with one of four types of alumina each having a different pore size;

DISCUSSION OF THE PREFERRED EMBODIMENTS

The following specific examples are given by way of illustration, and are not to be construed as limiting in any way the scope and spirit of the invention.

Examples 1 to 5.

In these examples hydrated alumina was prepared by incorporating an aqueous solution of acid ammonium carbonate into an aqueous solution of hydrated aluminum nitrate. $(Al(NO_3)_3 \cdot 9H_2O)$ A small quantity of an aqueous solution of acid ammonium carbonate was added to the hydrated alumina thus obtained to adjust the pH thereof. Thereafter gaseous carbon dioxide was admitted under pressure into the reactor and aging was conducted while agitating. After aging was completed the hydrated alumina was calcined at predetermined temperatures whereby various aluminas having high purity and uniform pore size as shown in the following Table 1, were obtained.

TABLE 1

| Example | 1 | 2 | 3 | 4 | 5 |
|---|---|---|---|---|---|
| Aging conditions: | | | | | |
| Temp. (° C.) | 175 | 150 | 210 | 175 | 215 |
| Time (hrs.) | 45 | 15 | 15 | 45 | 5 |
| Pressure of $CO_2$ (atom. press.) | 18 | 20 | 10 | 10 | 10 |
| pH, prior to aging | 5.50 | 5.25 | 5.50 | 5.5 | 5.5 |
| pH, after aging | 6.87 | 5.50 | 5.7 | 6.0 | 6.1 |
| Aging temp. (° C.) | 1,300 | 1,300 | 1,150 | 1,150 | 350 |
| Physical characteristics: | | | | | |
| Type of crystals | α | α | Θ | Θ | (¹) |
| Bulk specific gravity (g./m.) | | | 0.47 | 0.50 | 0.32 |
| Porosity (ml./g.) | 0.79 | 0.82 | 1.43 | 1.72 | 2.12 |
| Distribution peak (A.) | 1,350 | 980 | 650 | 290 | 340 |

¹ Boehmite.

Figure 3:
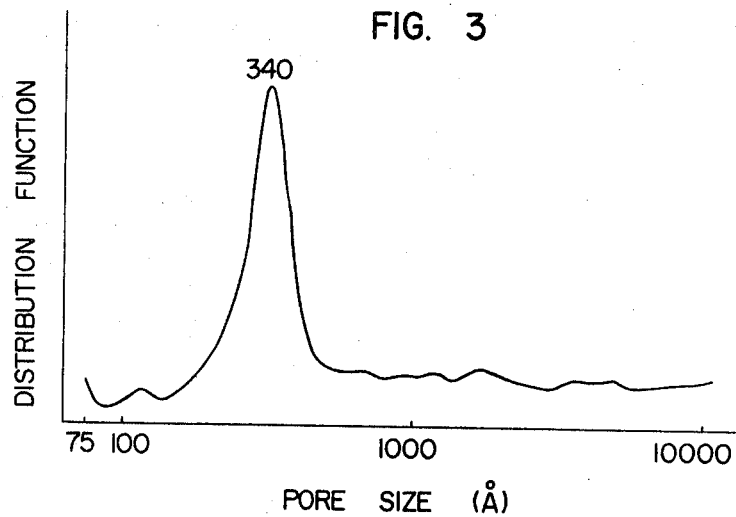
Figure 13:
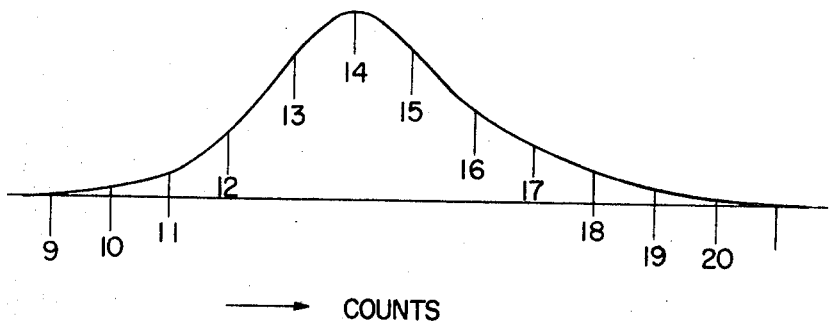
FIGS. 11, 12, 13 show distribution curves of different polyethylenes obtained from the columns used to plot the curve shown in FIG. 10.

Pore size distributions of alumina prepared in the manner described above are shown in FIGS. 1, 2, and 3. FIG. 1 shows the pore size distribution of the alumina of examples 2 in which it can be noted that a sharp peak appears at a pore size of 980 A. The ratio of the bottom extent of the sharp portion of the pore size distribution curve to the distribution peak is 1.34. FIG 2 shows the pore size distribution of the alumina of example 4, said distribution curve shows an extremely sharp peak at a pore size of 290 A. The ratio of the bottom extent of the sharp portion of the pore size distribution curve to the distribution peak is 1.5. Whereas FIG. 3 shows the pore size distribution curve of example 5, said distribution curve shows an extremely sharp peak at a pore size of 340 A. The ratio of the bottom of the sharp portion of the pore size distribution curve to the distribution peak is 1.8.

Example 6

Figure 5:
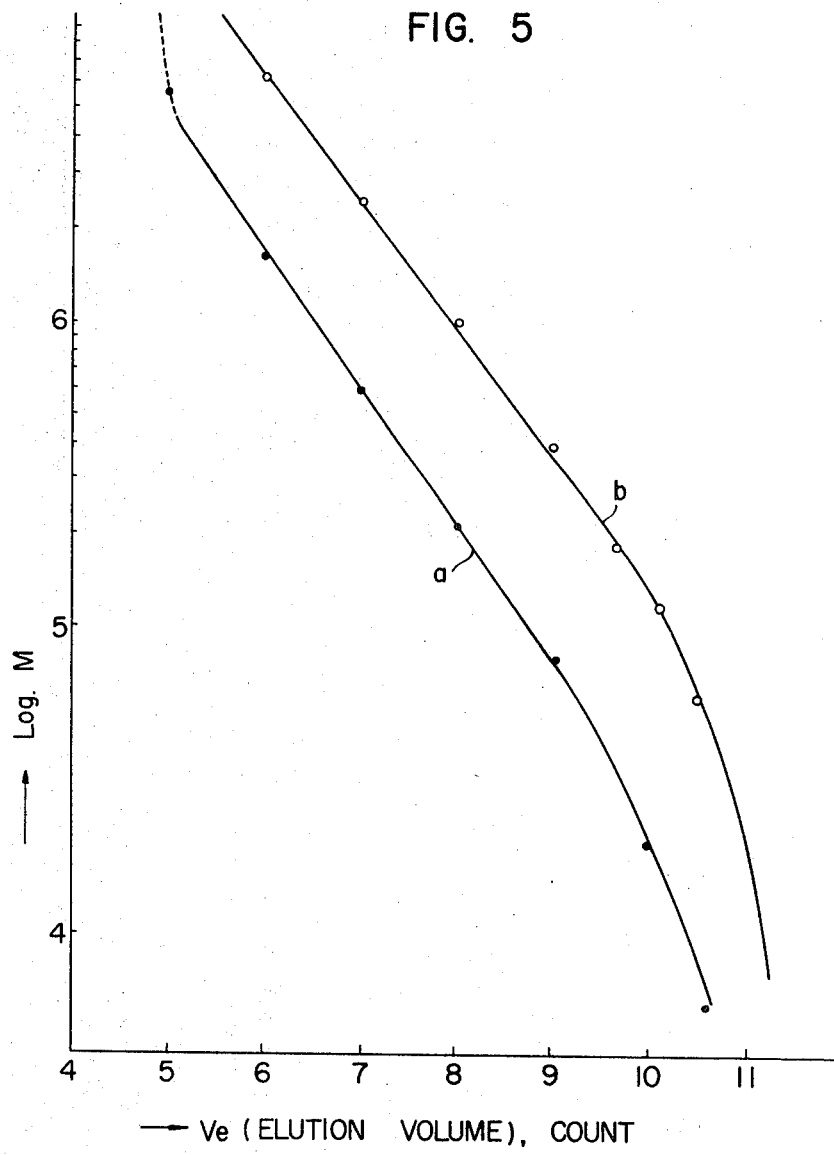
FIG. 5 shows calibration curves of Θ-alumina.

Respective calibration curves obtained by packing Θ-alumina obtained by examples 3 and 4 in independent columns are shown in FIG. 5 in which the ordinate represents the logarithm of the molecular weight of the molecules and the abscissa represents the elution volume, taking 5 cc. of elution solution as one count. Curves $a$ and $b$ represent the calibration curves of Θ-alumina obtained in examples 3 and 4 respectively. These calibration curves were plotted in the following manner.

Sample—Polystyrene, synthesized by anion polymerization and whose molecular weight and molecular weight distribution were accurately determined by using light scattering technique and ultracentrifugation, Solvent—tetrahydrafuran,
Concentration—0.5 g./100 m.1,
Flow rate—1 m.l/min.,
Quantity injected —0.5 m.l,
Column size—4 feet × 0.3 inch internal diameter,
Temperature—25 ∼ 28° C.

The alumina was packed in the column A. charging it into said column while said column was being vibrated by means of a vibrator. The vibration was 10 or 7 minutes after the height of the packed alumina had decreased to a predetermined value. The void volumes of columns respectively packed with aluminas of examples 3 and 4 were determined to be 23.2 m.l and 20.3 m.1 respectively. FIG. 4 shows that the upper limit that can be measured with these columns corresponds to $R = 2000$ A. or a molecular weight of about $8 \times 10^6$, while the lower limit to $R = 20 \sim 30$A. or a molecular weight of $1 \times 10^4$.

Example 7

This example shows weight)–comparison between various prior inorganic packing materials and the novel alumina. Each of the different packing materials shown in the following table 2 was packed in an independent column, 4 feet long and 0.3 inch diameter. For each column a log M (molecular weight)-Ve (elution volume) curve was plotted as shown in FIG. 4. The sample employed was a polystyrene whose average molecular weight had been accurately determined by using light scattering technique and ultracentrifigation. The solvent used was tetrahydroguran. The concentration of the sample was 0.5 g./100 cc. tetrahydrofuran. The flow rate was 1 cc./min. The quantity of sample injected was 0.5 m.l and the column temperature was 25° C.

TABLE 2

| Packing material | Porosity (cc./g.) | Distribution peak | Curve in fig. 4 |
|---|---|---|---|
| Silica C | 0.86 | 120 | a |
| Silica D | 0.84 | 300 | b |
| B10—glass 200 [1] | 0.05 | 100 | c |
| B10—glass 500 [1] | 0.08 | 250 | d |
| θ-alumina (Example 3) | 1.43 | 650 | e |

[1] *glass granules

As can be noted from FIG. 4, as compared to that of silica and glass granules, the selectivity of the novel alumina of the invention is excellent.

Example 8

Figure 6:
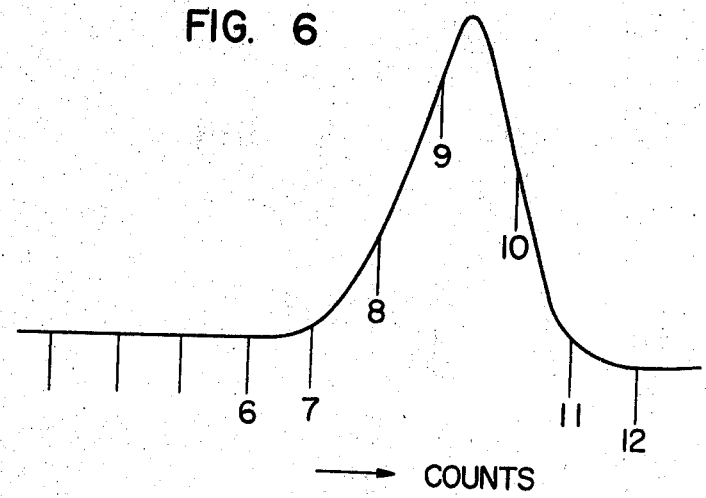
FIGS. 6 to 9 inclusive show distribution curves of various polystyrenes.
Figure 7:
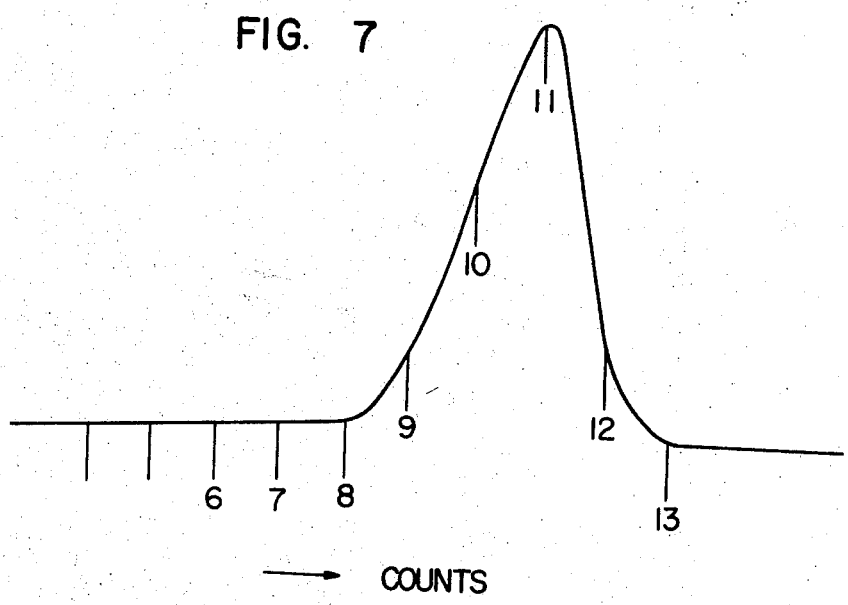

The process described in example 6 was repeated and two types of polystyrene, having different molecular weights were analyzed. A column packed with Θ-alumina according to example 3 was employed. The results are shown in FIG. 6 (MW: 160.000) and 7 (MW: 19.800). 19.800 ). The excellent symmetry of the elution curve obtained indicates the small adsorption of the packing material.

Example 9

Figure 8:
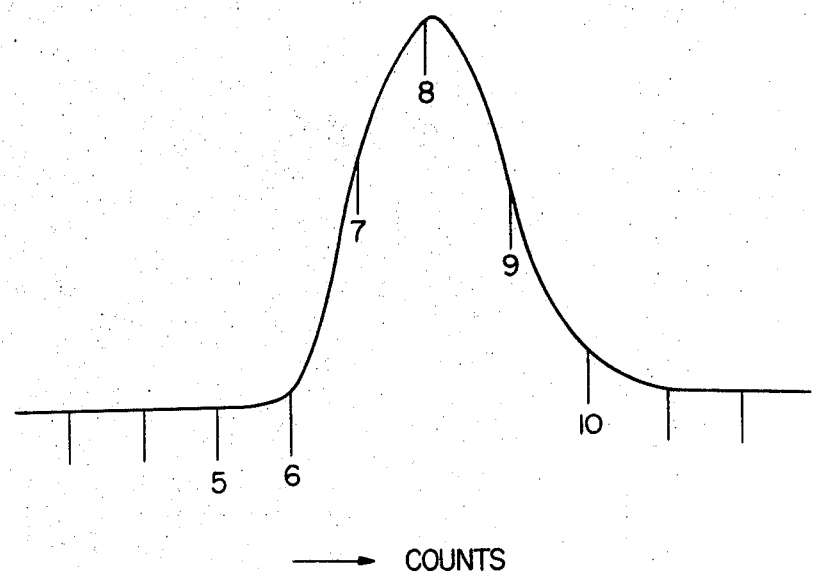
Figure 9:
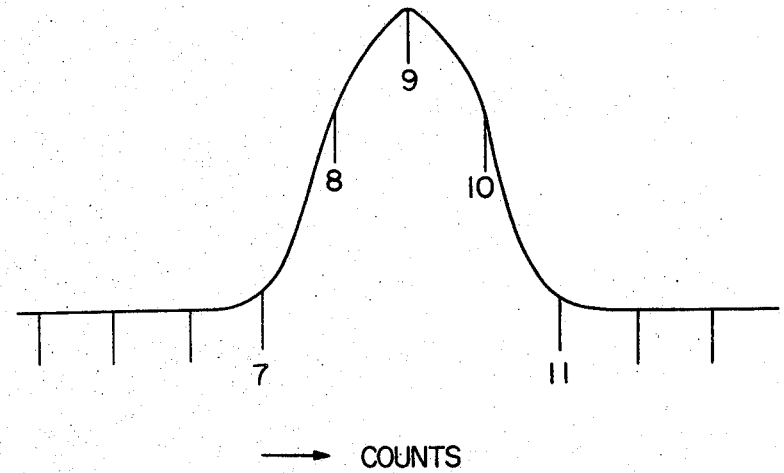

The process of example 6 was repeated; however, two types of polyethylene, having different molecular weights were analyzed. A column packed with Θ-alumina according to example 4 was employed. The results obtained are shown in FIGS. 8 (MW: 160,000) and 9 (MW: 51,000).

Example 10

Figure 10:
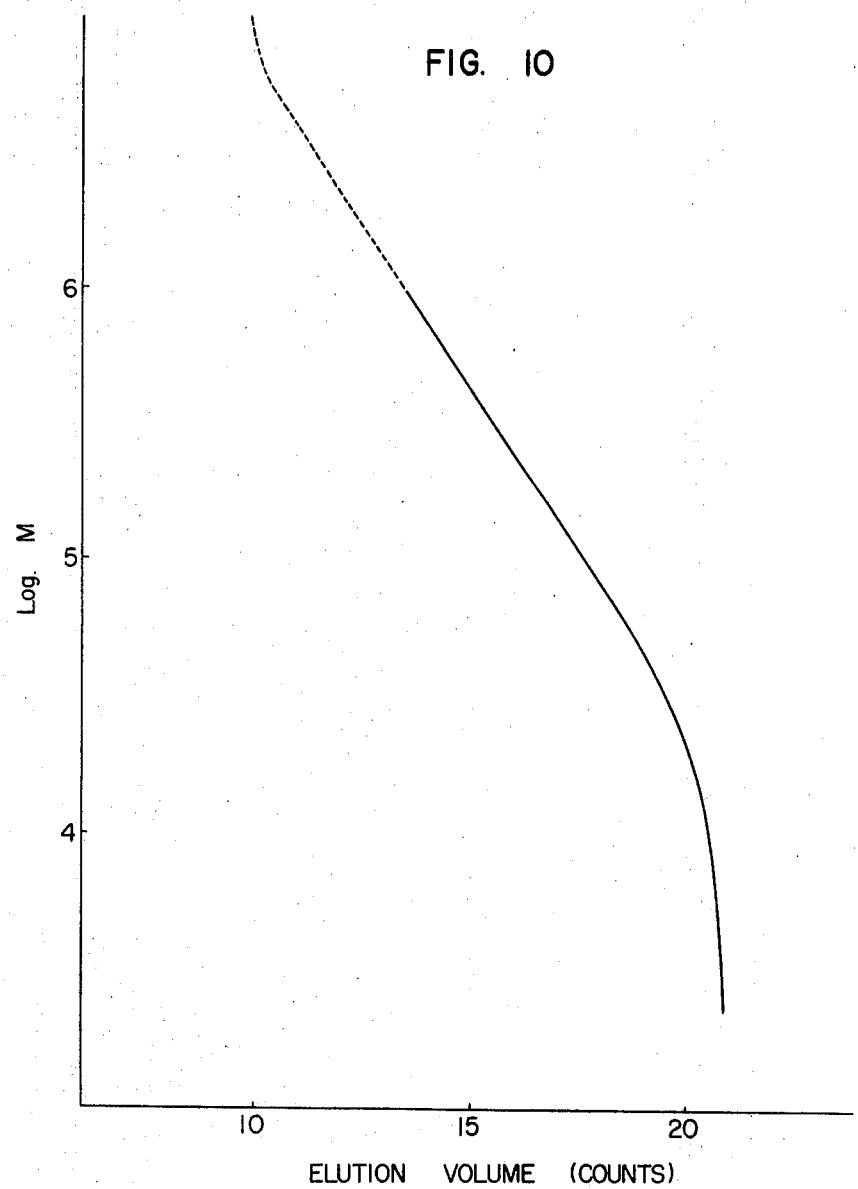
FIG. 10 shows a calibration curve of two columns packed with two types of Θ-alumina having different pore sizes.
Figure 11:
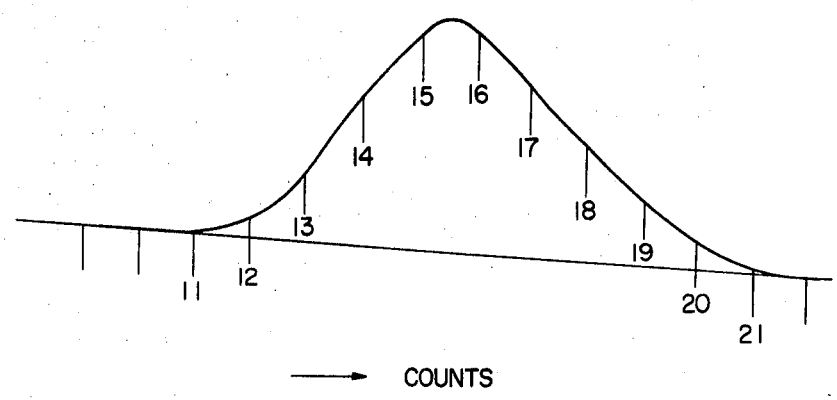
Figure 12:
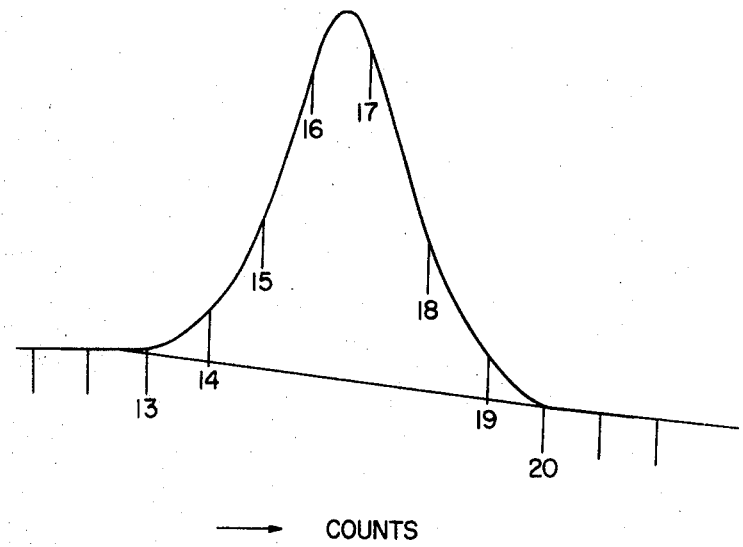

Two columns, identical to those of example 6, were respectively packed with Θ-aluminas according to examples 3 and 4. The two columns were connected in series. A log M–Ve curve of this column system is shown in FIG. 10. Three types of polystyrene having different molecular weights were analyzed. The results of said analysis are shown in FIG. 11 (MW: 257,800). 12 (MW: 179,300) and 13 (MW: 492,000).

The process of this example was repeated. However, the above-mentioned Θ-aluminas having different pore distribution peaks were mixed and used as the packing materials. The results obtained did not differ from the results obtained in the first part of this example, wherein said Θ-aluminas were not admixed. These results indicate that an alumina prepared by mixing aluminas having different distribution peaks can be employed as the packing material for gel permeation chromatography.

Example 11

Four types of aluminas according to examples 1 to 4 were respectively packed in four columns of stainless steel (0.3-inch inside diameter and 4 feet long) for gel permeation chromatography. These four columns were connected in series and used to determine the calibration curve of a 1 percent tetrahydrofuran solution of polystyrene. The calibration curve obtained is shown in FIG. 14.

Figure 15:
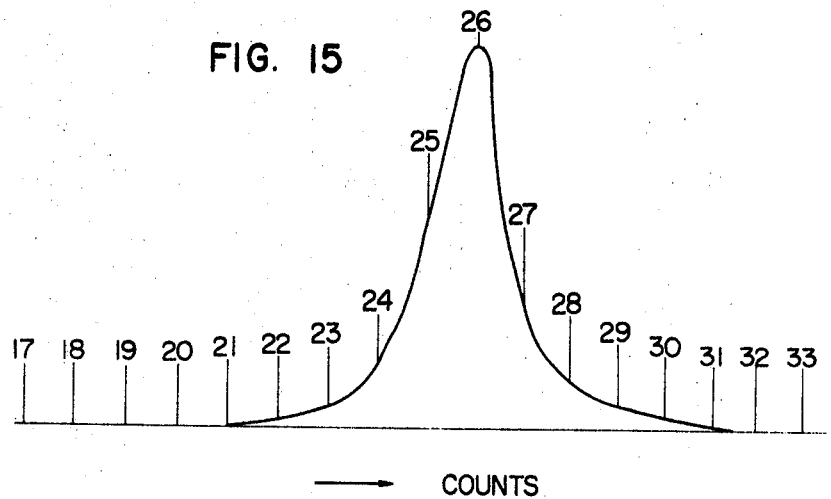
FIG. 15 shows a distribution curve obtained from the columns utilized to plot the curve shown in FIG. 14.

A 1 percent tetrahydrofuran solution of polyethylene having an average molecular weight of 180,300 (as determine by light scattering method) was analyzed with said column system at a temperature of 25° C., and an elution rate of 1.0 cc./min. The result is shown in FIG. 15. The GPC indicated an average molecular weight of 185,000, a value nearly equal to that which was determined by the light scattering method. The process of this example was repeated however an alumina obtained by mixing the above-mentioned alumina having different pore distribution peaks was used as the packing material. The same results were obtained.

Example 12

Figure 16:
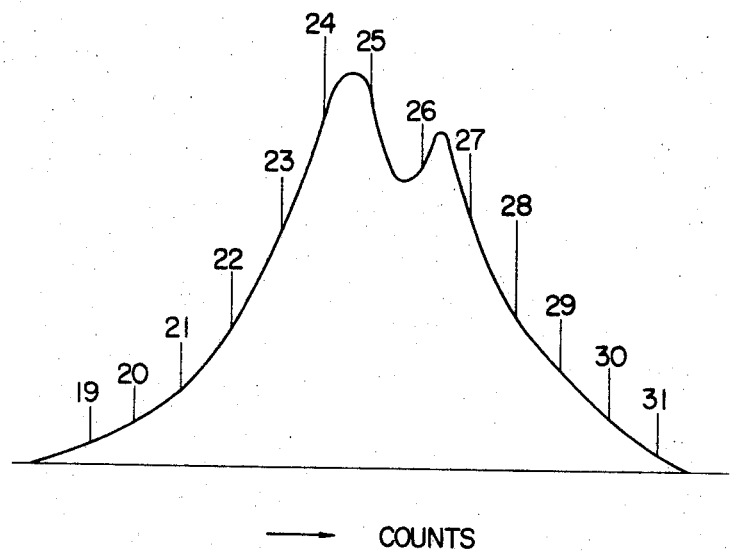
FIG. 16 shows a distribution curve of polybutadiene separated by utilizing two columns packed with cross-linked polyethylene and one column packed with alumina.

Two columns respectively packed with cross-linked polystyrene and respectively manifesting a permeability limit of $10^6$ and $5 \times 10^5$, and one column packed with Θ-alumina according to example 4 and having a sharp peak at 290A. were connected in series and used to analyze a 0.2 percent solution of polybutadiene in tetrahydrofuran. The rate of flow was 1 cc./min. and the column temperature was 20° C. The elution curve obtained is shown in FIG. 16.

Figure 17:
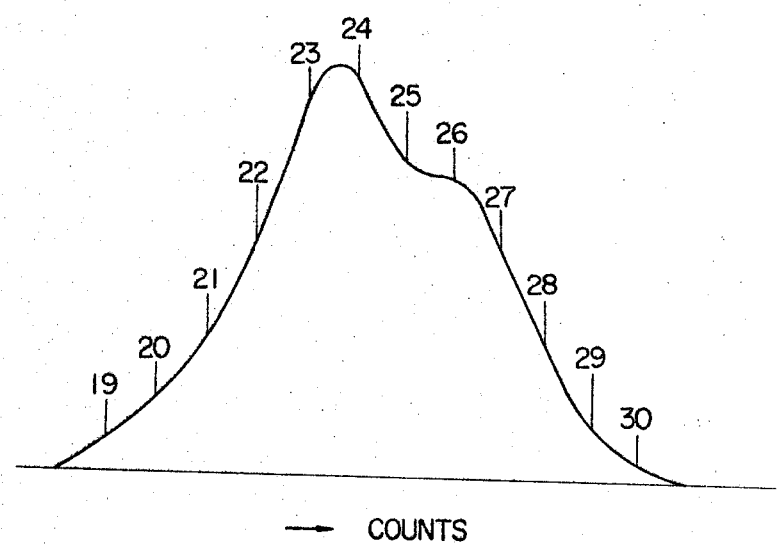
FIG. 17 shows a distribution curve of polybutadiene separated by using three columns packed with cross-linked polystyrene.

For comparison, a column packed with cross-linked polystyrene having a distribution peak at 300 A. was substituted for the above-described column packed with Θ-alumina and a similar analysis was carried out. The results obtained are shown in FIG. 17. A comparison of FIGS. 16 and 17 shows that the novel alumina packing material as compared with conventional cross-linked polystyrene affords a more distinct separation of the shoulder of the peak. This shows the excellent selectivity of said novel alumina packing material.

Example 13

Figure 18:
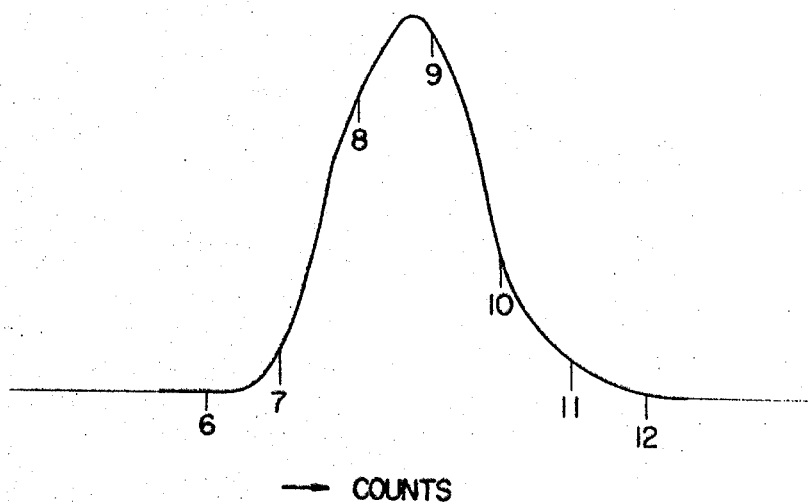
FIG. 18 shows a distribution curve of polystyrene separated at an elevated temperature.

The process of example 6 was repeated except that the polystyrene having a molecular weight of 160,000 was analyzed. A column packed with boehmite according to example 4 was used. The results obtained are shown in FIG. 18.

Example 14

The method of examples 8, 9, and 13 were repeated. The conditions employed were as described in example 6, except that a temperature of 150° C. was used and dichlorobenzene was employed as the solvent. Although the process of this example was continued over 2 months, no change was noted in the selectivity. Further, the distribution curve of the polystyrene was not affected by heat degradation of the packing material and therefore a stable separation was effected. On the other hand, a column packed with cross-linked polystyrene showed disturbance of the distribution curve only after 1 month use, thus evidencing heat degradation.

Example 15

Theoretical plates of a column packed with Θ-alumina of various particle size according to the method of example 6 were calculated. The result is shown in the following Table 3.

TABLE 3

|  | Particle size ($\mu$) | Theoretical plates |
|---|---|---|
| θ-alumina of— |  |  |
| Example 3 | 10–70 | 200 |
|  | 30–60 | 500 |
|  | 30–50 | 1,000 |
| Example 4 | 10–70 | 400 |
|  | 30–60 | 1,000 |
|  | 30–50 | 2,000 |

From Table 3, it is seen that the number of theoretical plates and hence the selectivity is increased by making the particle size uniform in the range of 30—30—microns.

I claim:

1. A packing material for use in gel permeation chromatography, said material comprising alumina having a particle size ranging from 10 to 70 microns, a distribution peak ranging from 10 to $10^5$ Angstrom units and a ratio of the bottom extent of the sharp portion of the pore size distribution curve to the distribution peak of less than 2:1.

2. A packing material according to claim 1 wherein said particle size range is from 30 to 60 microns, and said distribution peak range is from 50 to $10^4$ Angstrom units.

3. A packing material according to claim 1 wherein said particle size range is from 30 to 60 microns, and said distribution peak range is from 50 to 2500 Angstrom units.

4. A packing material according to claim 1 wherein said alumina is Θ-alumina, said particle size range is from 30 to 50 microns, and said distribution peak range is from 150 to 1000 Angstrom units.

5. A packing material according to claim 1 wherein said alumina is boehmite, said particle size range is from 30 to 50 microns, and said distribution peak range is from 50 to 1000 Angstrom units.

6. A packing material according to claim 1 wherein said alumina is α-alumina, said particle range is from 30 to 50 microns and said distribution peak range is from 900 to 2500 Angstrom units.

7. A chromatography column packed with a packing material as defined in claim 1.

8. In a gel permeation chromatographic device the improvement which comprises at least one column packed with a packing material as defined in claim 1.

9. A packing material for use in gel permeation chromatography, said material comprising a mixture of aluminas, each of said aluminas having different pore distribution peaks, a particle size ranging from 10 to 70 microns, a distribution peak ranging from 10 to $10^5$ Angstrom units and a ratio of the bottom extent of the sharp portion of the pore size distribution curve to the distribution peak of less than 2:1.

10. A packing material according to claim 9 wherein said mixture of aluminas is a mixture of Θ-aluminas, said particle size range is from 30 to 50 microns, and said distribution peak range is from 150 to 1000 Angstrom units.

11. A packing material according to claim 9 wherein said mixture of aluminas is a mixture of boehmite, said particle size range is from 30 to 50 microns, and said distribution peak range is from 50 to 1000 Angstrom units.

12. A packing material according to claim 9 wherein said mixture of aluminas is a mixture of α-aluminas, said particle size range is from 30 to 50 microns, and said distribution peak range is from 900 to 2500 Angstrom units.

13. (a) packing material according to claim 9 wherein said mixture of aluminas is a mixture of at least two types of alumina selected from the group consisting of (a) Θ-alumina having a distribution peak ranging from 50 to 1000 Angstrom units, (b) boehmite having a distribution peak ranging from 50 to 1000 Angstrom units and (c) α-alumina having a distribution peak ranging from 900 to 2500 Angstrom units, and said particle size range is from 30 to 50 microns.